US008827130B2

(12) United States Patent
Inoue (10) Patent No.: US 8,827,130 B2
(45) Date of Patent: Sep. 9, 2014

(54) METHOD AND APPARATUS FOR RIPPING PLATE MATERIAL, AND PLATE MATERIAL

(75) Inventor: Hidenori Inoue, Aikoh-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 456 days.

(21) Appl. No.: 13/172,981

(22) Filed: Jun. 30, 2011

(65) Prior Publication Data
US 2012/0027977 A1     Feb. 2, 2012

(30) Foreign Application Priority Data

Jul. 27, 2010     (JP) ................................ 2010-168691

(51) Int. Cl.
| | |
|---|---|
| *B32B 3/00* | (2006.01) |
| *B26F 3/02* | (2006.01) |
| *G11B 5/48* | (2006.01) |
| *B26F 1/40* | (2006.01) |
| *B21D 28/16* | (2006.01) |

(52) U.S. Cl.
CPC ............. *G11B 5/4806* (2013.01); *B26F 1/40* (2013.01); *B21D 28/16* (2013.01)
USPC ..................................... 225/1; 29/832; 225/2

(58) Field of Classification Search
USPC .............................................. 225/1, 2; 29/832
See application file for complete search history.

(56) References Cited

U.S. PATENT DOCUMENTS

2004/0250417 A1\* 12/2004 Arneson et al. ................. 29/832

FOREIGN PATENT DOCUMENTS

JP       2000-057723       2/2000

\* cited by examiner

*Primary Examiner* — Brent O'Hern
(74) *Attorney, Agent, or Firm* — Jordan and Hamburg LLP (57) ABSTRACT

A method of ripping a plate material having a resilient part, a frame, and an easily breaking part formed between the resilient part and the frame includes holding the frame between an upper pad and a die on a first side of the easily breaking part, moving a punch toward a lower pad that is retractable against pushing force, to clamp the resilient part between the punch and the lower pad on a second side of the easily breaking part, and driving the punch so that the punch guides the plate material and applies tension to the easily breaking part in a surface direction of the plate material, thereby ripping the plate material along the easily breaking part. The method is capable of ripping the plate material without causing burrs.

11 Claims, 7 Drawing Sheets

METHOD AND APPARATUS FOR RIPPING PLATE MATERIAL, AND PLATE MATERIAL

BACKGROUND OF THE INVENTION

1. Field of the Invention

The present invention relates to a method of and an apparatus for ripping a plate material, and to a plate material. The plate material is a material used to manufacture, for example, a head suspension of a disk drive installed in an information processing apparatus such as a personal computer.

2. Description of Related Art

A disk drive installed in an information processing apparatus contains a rotating magnetic disk or magneto-optical disk and a head suspension that is provided with a head or an element to write and read data to and from the disk. In the disk drive, the head suspension is supported with an arm of a carriage that is driven by an actuator.

The head suspension includes a base plate, a load beam, and the like that are made from plate materials. In practice, a plurality of head suspensions are chained together at predetermined pitches in a frame and are separated from the frame into individual head suspensions as disclosed in Japanese Unexamined Patent Application Publication No. 2000-57723.

Figure 7A:
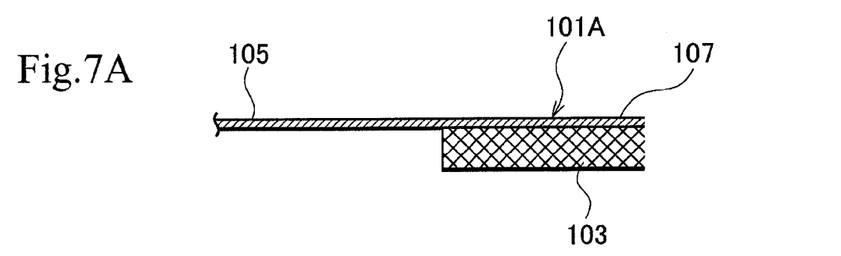
Figure 7B:
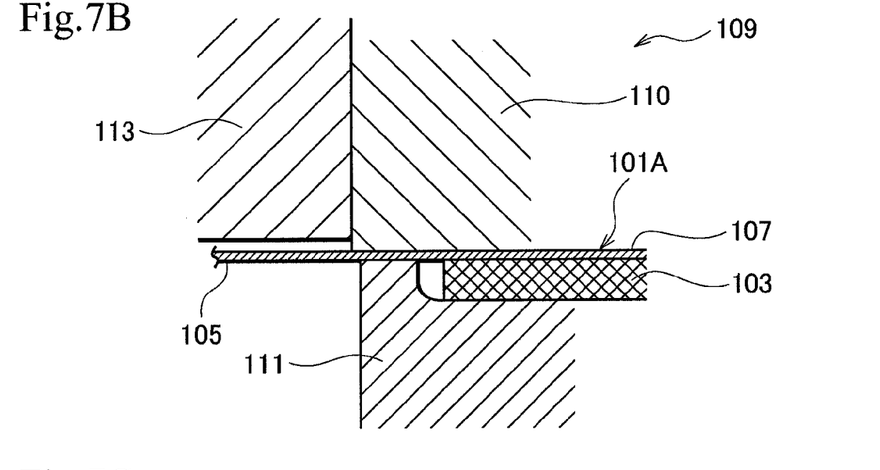
FIG. 7B illustrates the chained head suspension set on a shearing apparatus.
Figure 7C:
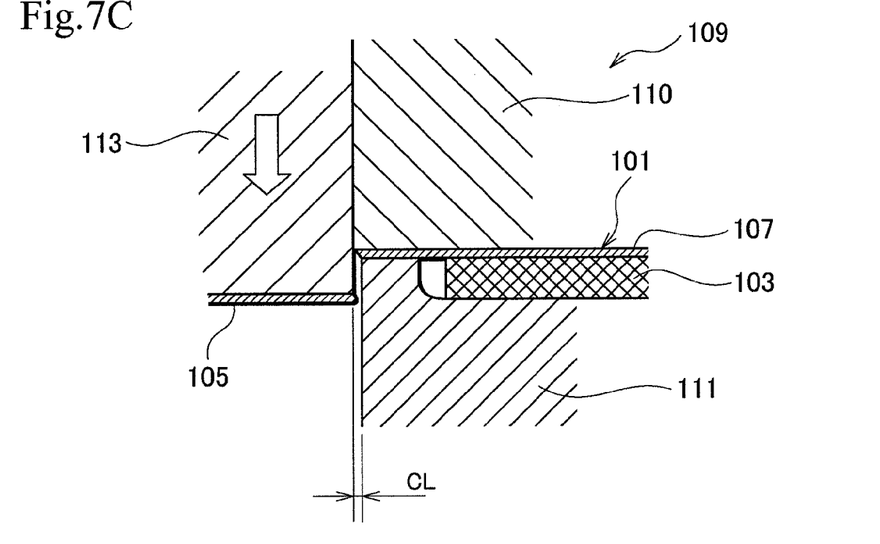
FIG. 7C illustrates the head suspension separated from the frame.

FIGS. 7A, 7B, and 7C are sectional views illustrating a method of separating a chained head suspension from a frame according to a related art, in which FIG. 7A partly illustrates the chained head suspension, FIG. 7B illustrates the chained head suspension set on a shearing apparatus, and FIG. 7C illustrates the head suspension separated from the frame.

In FIG. 7A, the chained head suspension 101A includes a base plate, a stiffener 103 welded to the base plate, and a resilient part 107 spot-welded to the stiffener 103. The resilient part 107 is integral with the frame 105.

The chained head suspension 101A is separated from the frame 105 into an individual head suspension 101. For this, an upper pad 110 of the shearing apparatus 109 is lowered to hold the resilient part 107 and stiffener 103 between the upper pad 110 and a lower die 111 as illustrated in FIG. 7B. Then, a punch 113 is lowered to shear a part between the frame 105 and the resilient part 107, thereby producing the individual head suspension 101.

To prevent burrs from occurring during shearing with the punch 113 and die 111, a clearance CL between the punch 113 and the die 111 is set to be very small. For example, the clearance CL is set to several microns and a surface roughness of each of the punch 113 and die 111 facing the clearance CL is set to have a maximum height Ry in submicron.

Narrowing the clearance CL between the punch 113 and the die 111, however, increases the cost of the shearing apparatus 109.

To solve this problem, there is a ripping technique that allows a clearance between the punch and the die to be roughly set.

Figure 8A:
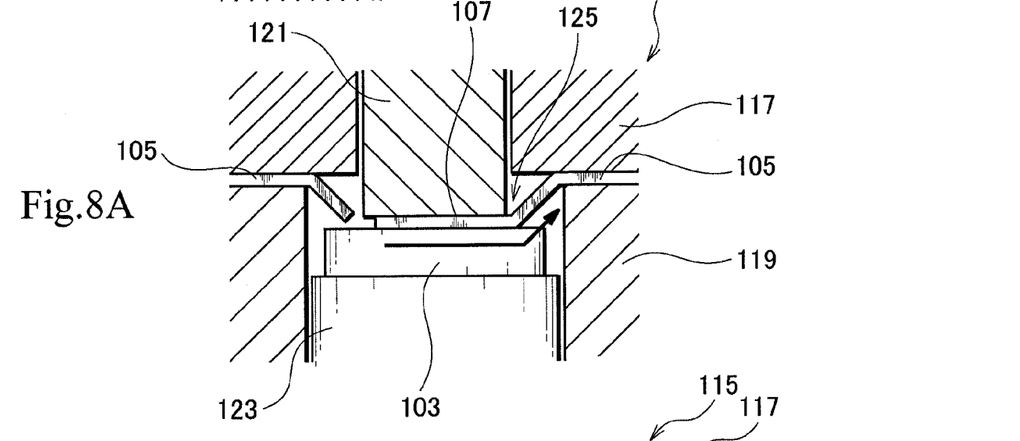
Figure 8B:
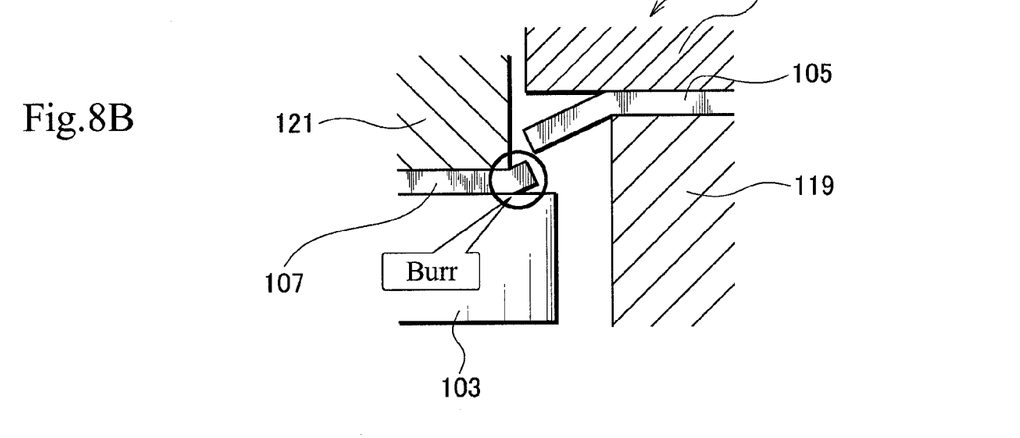
Figure 8C:
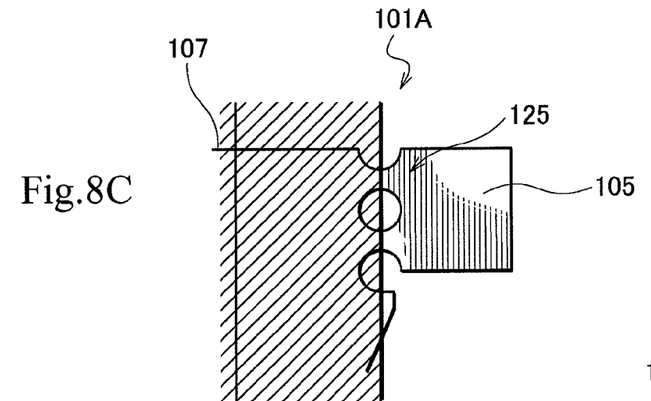

FIGS. 8A, 8B, and 8C illustrate a ripping apparatus according to a related art, in which FIGS. 8A and 8B are sectional views and FIG. 8C a plan view of the ripping apparatus.

In FIGS. 8A and 8B, the ripping apparatus 115 has an upper pad 117, a lower die 119, a punch 121, and a lower pad 123. The lower pad 123 is supported with, for example, a spring so that the lower pad 123 may descend when the punch 121 is lowered.

In FIG. 8C, a resilient part 107 of a chained head suspension 101A is connected to a frame 105 through an easily breaking part 125.

The chained head suspension 101A is fed into the ripping apparatus 115 so that the stiffener 103 and resilient part 107 of the chained head suspension 101A are positioned between the punch 121 and the lower pad 123.

The punch 121 and upper pad 117 are lowered, and on one side of the easily breaking part 125, the frame 105 is held between the upper pad 117 and the die 119.

The punch 121 is lowered relative to the lower pad 123, to clamp the stiffener 103 and resilient part 107 between them on the other side of the easily breaking part 125 and break or rip the easily breaking part 125.

This separates the chained head suspension 101A from the frame 105 into an individual head suspension 101.

According to the related art of FIGS. 8A to 8C, the easily breaking part 125 is sometimes not aligned with an edge of the punch 121, to apply oblique tension to the easily breaking part 125. Such oblique tension causes a burr as illustrated in FIG. 8B when the easily breaking part 125 is ripped.

In the case of the head suspensions 101A chained together through the frame 105, heat during welding and the like may vary pitches among the chained head suspensions 101A, to cause burrs as illustrated in FIG. 8B during the ripping process.

SUMMARY OF THE INVENTION

An object of the present invention is to provide a method of and an apparatus for ripping a plate material, capable of conducting a ripping operation without causing burrs. The present invention also provides a plate material to be ripped according to the method and apparatus.

In order to accomplish the objects, a first aspect the present invention provides a method of ripping a plate material having an easily breaking part. The method includes holding the plate material between an upper mold and a lower mold on a first side of the easily breaking part, moving a punch toward a pad to clamp the plate material between the punch and the pad on a second side of the easily breaking part, and applying tension to the easily breaking part in a surface direction of the plate material through operation and guiding with the punch, thereby ripping the plate material along the easily breaking part.

According to a second aspect of the present invention, the easily breaking part of the plate material has a configuration of any one of an alternation of a through hole and a narrow part, an alternation of a thin part and a narrow part, and an elongated thin part, so as to serve as a breakable bound.

A third aspect of the present invention provides an apparatus for the method of the first aspect. The apparatus includes upper and lower molds to hold the plate material between them on a first side of the easily breaking part, a punch having an edge portion that is provided with a guide face overhanging the pad and a pad being retractable against pushing force, and the punch guiding the plate material along the guide face, to apply the tension to the easily breaking part in the surface direction of the plate material.

According to the first aspect, no bending force is applied to the easily breaking part. This prevents the easily breaking part from producing burrs when it is ripped.

According to the second aspect, tension applied to the easily breaking part surely breaks the easily breaking part.

According to the third aspect, a clearance between the punch and the lower mold may roughly be set. This reduces the cost of the apparatus.

BRIEF DESCRIPTION OF THE DRAWINGS

FIGS. 1A, 1B, and 1C are views illustrating a head suspension according to an embodiment of the present invention, in which

FIGS. 7A, 7B, and 7C are views illustrating a method of separating a chained head suspension from a frame according to a related art, in which FIG. 7A partly illustrates the chained head suspension, FIGS. 8A, 8B, and 8C are views illustrating a ripping apparatus according to a related art, in which FIGS. 8A and 8B are sectional views and FIG. 8C a plan view of the ripping apparatus.

DETAILED DESCRIPTION OF EMBODIMENTS

Embodiments of the present invention will be explained in detail with reference to the drawings. Each embodiment rips a plate material by applying tension in a surface direction of the plate material without causing burrs.

In the embodiment, the method of and apparatus for ripping plate material are applied to the manufacturing a head suspension from a plate material by ripping a chained head suspension off a frame to complete the individual head suspension.

Figure 1A:
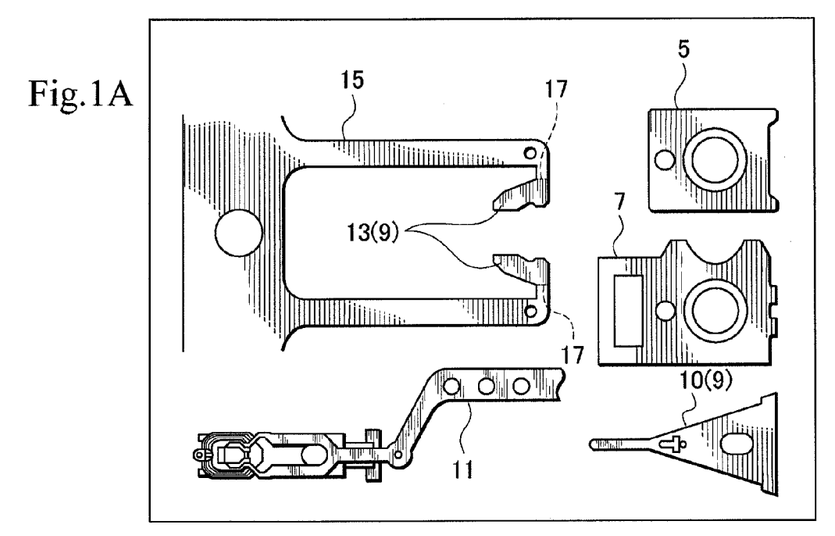
FIG. 1A is a view illustrating parts of a chained head suspension.
Figure 1B:
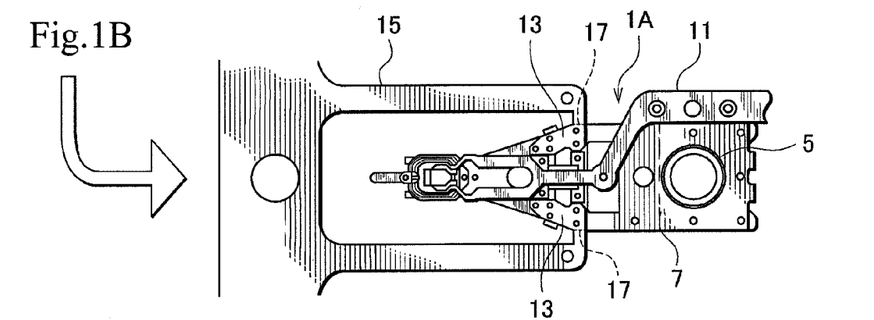
FIG. 1B is a plan view illustrating the chained head suspension with a frame.
Figure 1C:
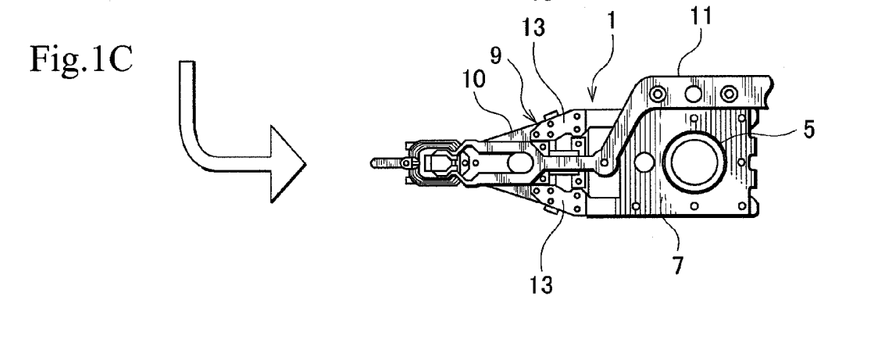
FIG. 1C is a plan view illustrating a complete head suspension separated from the frame.
Figure 2:
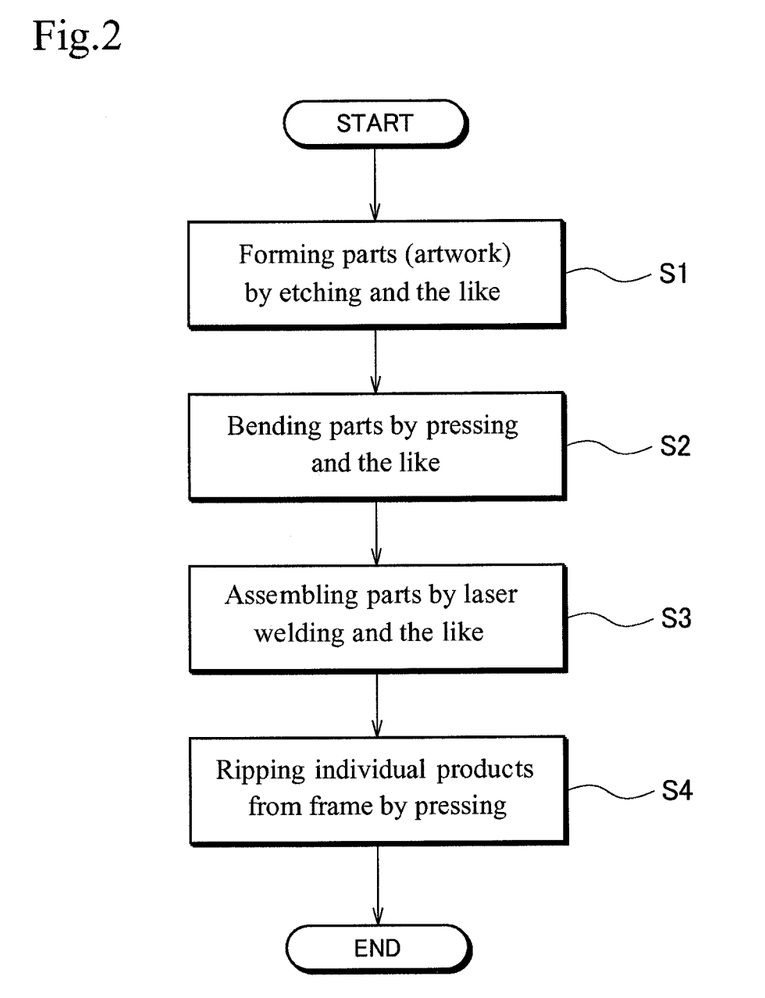
FIG. 2 is a flowchart illustrating steps of manufacturing a head suspension employing ripping method and apparatus according to the embodiment of the present invention.

First, a method of manufacturing a head suspension will be explained with reference to FIGS. 1A to 2 in which FIG. 1A is a view illustrating parts of a chained head suspension, FIG. 1B is a plan view illustrating the chained head suspension with a frame, FIG. 1C is a plan view illustrating a complete head suspension separated from the frame, and FIG. 2 is a flowchart illustrating steps of manufacturing the head suspension.

In FIG. 1A, the chained head suspension 1A includes a base plate 5, a stiffener 7, and a load beam 9 as plate materials. The load beam 9 includes a rigid part 10, a flexure 11, and a resilient part 13. The resilient part 13 is integral with a frame 15.

These components are welded together by, for example, laser spot welding to form the chained head suspension 1A as illustrated in FIG. 1B. Many chained head suspensions 1A are chained together through the frame 15 and the chained head suspensions 1A are ripped from the frame 15 into individual head suspensions 1 as illustrated in FIG. 1C.

The base plate 5 is made from a plate material, in particular a metal plate such as a stainless steel plate having a thickness of about 150 µm and is formed by, for example, punching or etching. The base plate 5 is a part of the head suspension 1 that is attached to an arm (not illustrated) of a carriage (not illustrated) by ball caulking. The carriage is driven by a voice coil motor (not illustrated).

The stiffener 7 is made from a plate material, in particular a metal plate such as a stainless steel plate having a thickness of about 150 µm and is formed by, for example, etching. The stiffener 7 is connected to the base plate 5 by spot-welding or other fixing method and a front end of the stiffener 7 is connected to an end of the resilient part 13 by spot-welding or other fixing method.

The rigid part 10 is made from a plate material, in particular a metal plate such as a stainless steel plate having a thickness of about 30 µm and is formed by, for example, etching. A base end of the rigid part 10 is connected to the other end of the resilient part 13 by spot-welding or other fixing method. The rigid part 10 and resilient part 13 form the load beam 9.

Each of the base plate 5, stiffener 7 and rigid part 10 c the material, thickness and the like as an example, so that they may have other material, thickness and the like appropriate to a head suspension.

The flexure 11 has a multilayer structure including a stainless steel base having a thickness of about 20 µm, an insulating layer made of polyimide, and a wiring layer made of copper. The flexure 11 has a supporting function of supporting a slider having a magnetic head and a wiring function of electrically connecting the magnetic head to an amplification circuit arranged at a base part of the head suspension.

The flexure 11 employs the material, thickness, the multilayer structure and the like as an example, so that it may have other material, thickness, the multilayer structure and the like appropriate to the flexure realizing the supporting function and wiring function.

The frame 15 integrally supports a plurality of chained head suspensions 1A that are chained together in the frame 15 and are ripped from the frame 15 into individual head suspensions 1 in their lateral direction. That is, the lateral direction of the chained head suspension 1A or the complete head suspension 1 is a ripping direction.

Namely, an easily breaking part 17 is formed between the resilient part 13 and the frame 15, and along the easily breaking part 17, the chained head suspension 1A is ripped off the frame 15. At this time, the resilient part 13 becomes a part of the complete head suspension 1. The head suspension 1 supports the magnetic head having a read/write element and is supported with the carriage.

FIG. 2 is a flowchart illustrating steps of manufacturing the head suspension 1. The manufacturing steps include a pattern drawing or parts forming (artwork) step S1 by etching and the like, a bending step S2 by pressing and the like, an assembling step S3 by laser welding and the like, and ripping step S4. In the manufacturing steps, the ripping step S4 only has to The parts forming step S1 forms plates that are parts of the chained head suspension 1A by, for example, punching and etching.

The bending step S2 processes the parts if needed. For example, the bending step S2 forms a dimple on the rigid part 10 by pressing, the dimple being used to support the slider.

The assembling step S3 welds the parts of the chained head suspension 1A to one another. For example, the stiffener 7 is welded to the base plate 5, a front end of the stiffener 7 is welded to a base end of the resilient part 13, a base end of the rigid part 10 is welded to a front end of the resilient part 13, and the flexure 11 is welded to the rigid part 10.

The ripping step S4 uses a ripping apparatus (to be explained later) to rip the resilient part 13 off the frame 15, to form the individual head suspension 1. In the manufacturing steps, it is important to rip the chained head suspension 1A off the frame 15 to form the complete head suspension 1 in the ripping step S4, and the steps S1-S3 only have to form the chained head suspension 1A to be ripped off. Thus, the steps S1-S3 may employ other known technique.

Figure 3:
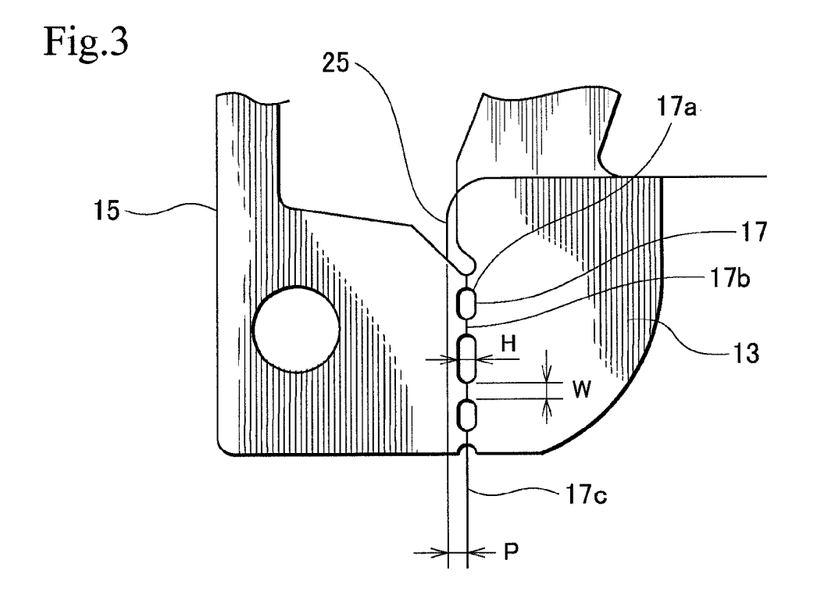
FIG. 3 is a plan view illustrating an easily breaking part formed between a resilient part and a frame of the chained head suspension of FIG. 1.
Figure 4:
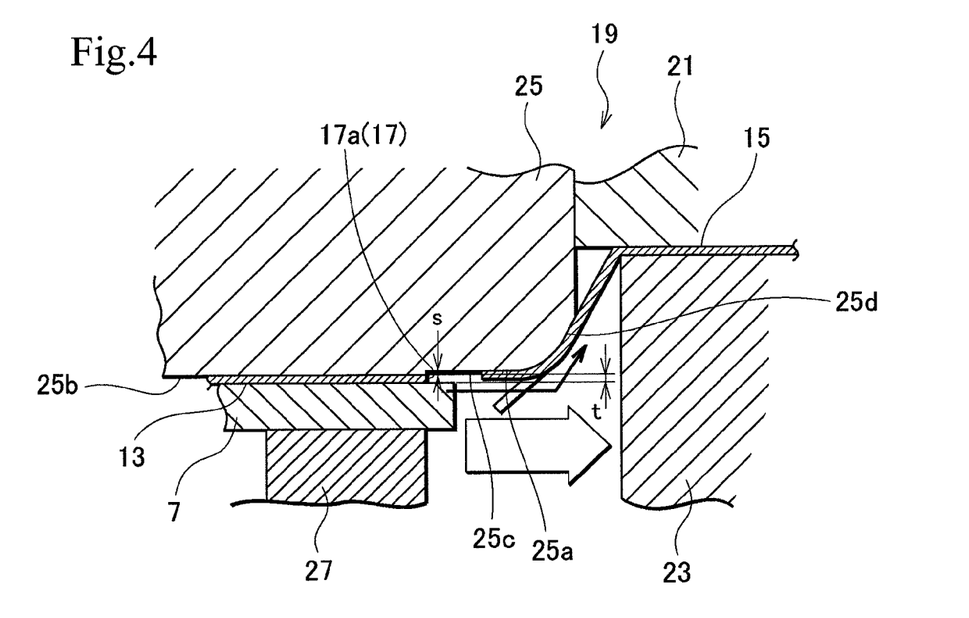
FIG. 4 is a sectional view partly illustrating a ripping apparatus and method according to the present invention, to rip a resilient part of the chained head suspension of FIG. 3 off the frame.
Figure 5A:
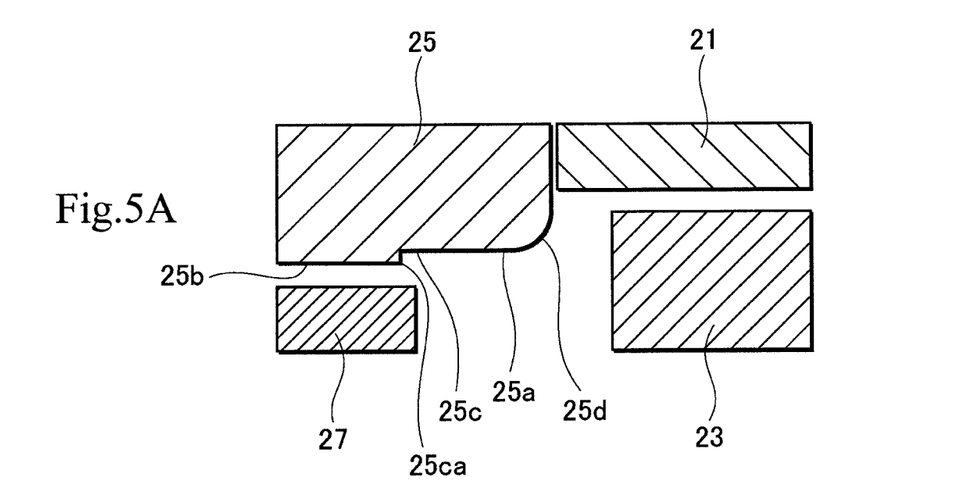
FIG. 5A is a sectional view partly illustrating the ripping apparatus of FIG. 4.
Figure 5B:
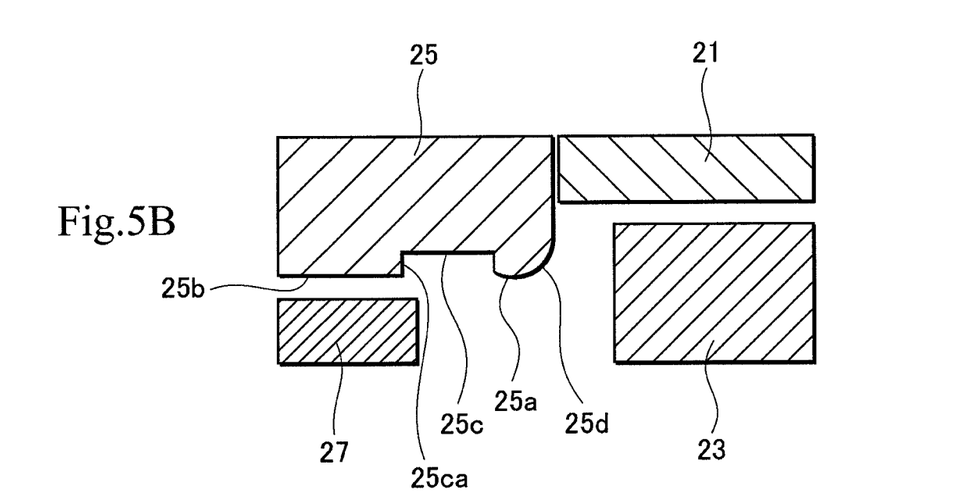
FIG. 5B is a sectional view partly illustrating a modification of the ripping apparatus.

FIG. 3 is a plan view illustrating the easily breaking part 17 formed between the resilient part 13 and the frame 15, FIG. 4 is a sectional view illustrating the ripping apparatus implementing the method of ripping the plate material between the resilient part 13 from the frame 15, FIG. 5A is a sectional view partly illustrating the ripping apparatus, FIG. 5B is a sectional view partly illustrating a modification of the ripping apparatus, and FIGS. 6A to 6D are sectional views illustrating examples of overhanging edge portion and and it's end edge of the punch of the ripping apparatus.

The easily breaking part 17 formed between the resilient part 13 and the frame 15 of FIG. 3 is torn oil with the use of the ripping apparatus 19 of FIG. 4.

In FIG. 3, the easily breaking part 17 includes through holes 17a and narrow parts 17b that are alternated and serve as breakable boundary along break line 17c (as shown in FIG. 3). When the thickness "t" of the resilient part 13 made of SUS304 is in the range of about 15 μm to 100 μm, the length "w" of the narrow part 17b is set to be in the range of about two to four times greater than the thickness "t". According to the embodiment, the length "w" is about three times as large as the thickness "t". The length "w" is a dimension in a direction orthogonal to the ripping direction in the same plane. The thickness "t" is a dimension in a direction orthogonal to both the direction of the length "w" and the ripping direction.

According to tests conducted by the inventors, a large elongation occurs during a ripping process if the length "w" is smaller than about two times the thickness "t" and a ripping difficulty increases if the length "w" is greater than about four times the thickness "t".

The through hole 17a has a width "H". A break line 17c passing through the center of each through hole 17a is distanced from an outer edge of a punch 25 of the ripping apparatus 19 by a distance "P" which is set to be equal to H.

The embodiment employs the length "w", the width "H", the distance "P" and the like as an example. It may employ different length, width, distance and the like according to the material, the thickness "w" and the like.

Instead of the through holes 17a and narrow parts 17b, the easily breaking part 17 may be formed of an alternation of the narrow part 17b and a thin part thinner than the narrow part 17b, or an elongated or continuous thin part without the narrow part 17b. The through holes 17a may be formed by etching and the thin parts may be formed by half-etching. The through holes 17a and thin parts may be formed by pressing.

In FIGS. 4 and 5A, the ripping apparatus 19 has an upper pad 21 of an upper mold and a lower die 23 of a lower mold. The upper pad 21 has the punch 25. The punch 25 faces a lower pad 27. The lower pad 27 is retractable against pushing force provided by a resilient member such as a coil spring. As a resilient member, other known springs may be employed.

The punch 25 has a guide face 25a. An edge portion in a lateral direction of the punch 25 overhangs the lower pad 27 and an overhanging part of the punch 25 forms the guide face 25a on a lower surface thereof. The lateral direction of the punch 25 corresponds to the lateral direction of the chained head suspension 1A along the ripping direction. The edge portion in the lateral direction of the punch 25 is an area extending laterally inwardly from an end edge of the punch 25.

The guide face 25a has a step portion 25c that is stepped with respect to the punch face 25b, and a flat portion that is between the step portion 25c and a curved face 25d as shown in FIGS. 4 and 5A. The step portion 25c has a bottom face that is laterally inwardly adjoining and flush with the guide lace 25a. The step portion 25c is further set back than the punch face 25b against the lower pad 27, i.e. toward an upper side in FIGS. 4 and 5A, so as not to interfere with the easily breaking part 17. A laterally inner end 25c a of the step portion 25c is above the lower pad 27.

As illustrated in FIG. 5B, the punch 25 may be modified so that the step portion 25c is partly formed on the overhanging part of the punch 25. In this case, there is no level difference between the punch face 25b and the guide face 25a.

Figure 6A:
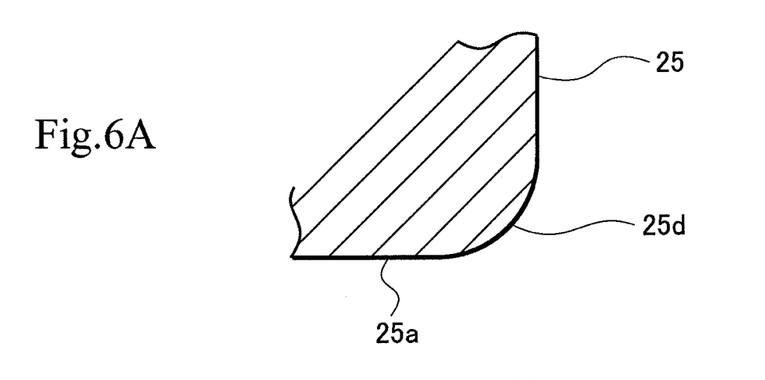
FIGS. 6A, 6B, 6C, and 6D are sectional views illustrating examples of overhanging edge portion and it's end edge of the punch of the ripping apparatus.
Figure 6B:
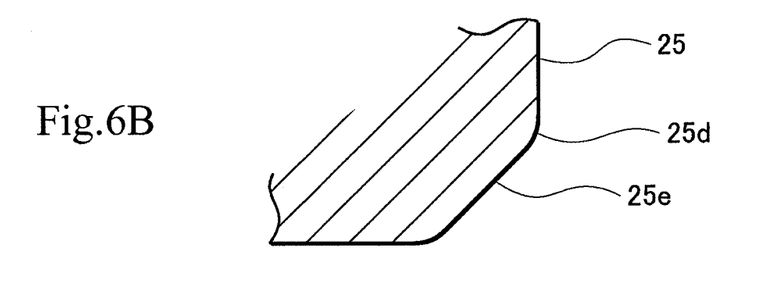
Figure 6C:
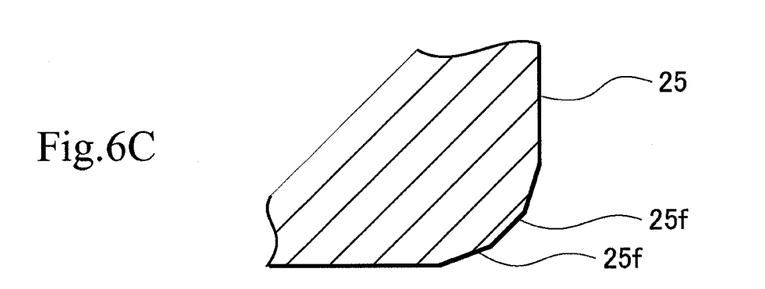
Figure 6D:
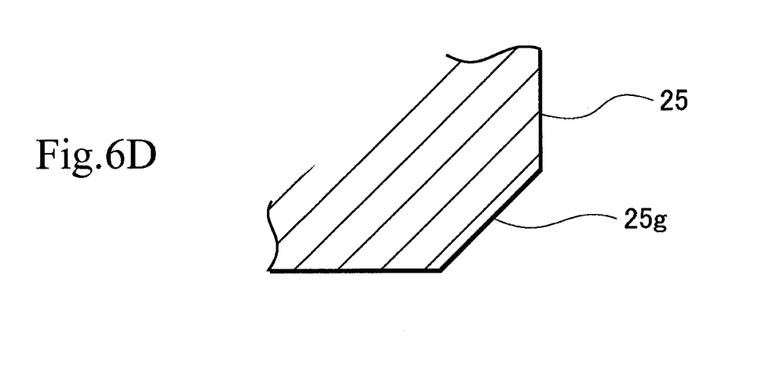

FIGS. 6A to 6D illustrate various examples of the overhanging edge portion and it's end edge of the punch 25. The overhanging edge portion is provided to allow the frame 15 to slide along it. For this, various forms are possible. In FIG. 6A, the overhanging edge portion has a curved face 25d that is continuous to the guide face 25a on the end edge. In FIG. 6B, the overhanging edge potion involves a slope 25e and a curved face 25d at each side of the slope 25e on the end edge. In FIG. 6C, the overhanging edge portion involves a plurality of slopes 25f on the end edge. The number of the plural slopes 25f is optional. In FIG. 6D, the overhanging edge portion involves a slope 25g on the end edge.

A method of ripping a plate material according to an embodiment of the present invention will be explained in connection with ripping the chained head suspension 1A from the frame 15 (FIGS. 1A to 1C).

In FIGS. 4 and 5A, the chained head suspension 1A is fed to the ripping apparatus 19 so that the resilient part 13 and stiffener 7 are positioned between the punch 25 and the lower pad 27.

The punch 25 and upper pad 21 are lowered, so that the frame 15 on a first side of the easily breaking part 17 is held between the upper pad 21 and the die 23.

The punch 25 is further lowered and the resilient part 13 and stiffener 7 on a second side of the easily breaking part 17 are clamped between the punch 25 and the lower pad 27. In the holding state, the punch 25 and lower pad 27 are descended against the pushing force acting on the lower pad 27.

When the punch 25 descends, the frame 15 slides along the guide face 25a and curve 25d, to apply tension to the easily breaking part 17 in a surface direction of the resilient part 13 and frame 15.

Namely, the sliding portion of the frame 15 is the stopped portion that is stopped by the guide lace 25 in the thickness direction. The stopped portion is shifted toward the held portion held between the die 23 and upper pad 21 on the first side with respect the easily breaking part 17. Therefore, a portion of the frame 15 between the held portion held with the punch 25 and lower pad 27 on the second side and the stopped portion is set to be at a shallower elevation, as shown in FIG. 4 (and thereby at a different elevation), than a portion between the held portion on the first side and the slopped portion. This applies relatively large tension to the easily breaking part in a original surface direction of the frame 15 and resilient part 13.

The tension applied to the easily breaking part 17 breaks the easily breaking part 17, to form the individual head suspension 1.

In this way, the method of ripping a plate material according to the embodiment applies no bending force on the easily breaking part 17, so that no burrs are produced.

According to the embodiment, the guide face 25a of the punch 25 is formed at the edge portion laterally inwardly extending from the end edge of the punch 25 overhanging the lower pad 27. Even if pitches among the chained head suspensions 1A vary from one to another due to heat applied when assembling parts into the chained head suspensions 1A, the guide face 25a absorbs such pitch variations, to prevent the occurrence of burrs during the ripping process.

According to the embodiment, the easily breaking part 17 is formed with the alternating through holes 17a and narrow parts 17b. Instead, the easily breaking part 17 may be formed with an alternation of a thin part and the narrow part, or an elongated thin part.

Therefore, the easily breaking part 17 surely breaks due to tension applied thereto during the ripping process without producing particles or burrs.

According to the embodiment, the ripping apparatus 19 includes the upper pad 21, die 23, punch 25, and lower pad 27. The punch 25 has the guide face 25a overhanging the lower pad 27. The guide face 25a guides the frame 15.

This configuration allows a clearance between the punch 25 and the die 23 to be roughly set, thereby minimizing the cost of the ripping apparatus 19.

According to the embodiment, the chained head suspension 1A is integral with the frame 15 through the resilient part 13. Any one of the parts of the head suspension 1, such as the base plate 5, stiffener 7, resilient part 10, and flexure 11 may be chained more than one through a frame and each may be ripped off the frame according to the present invention.

The present invention may be applied to other plate materials to complete a product by ripping off a support member such as a frame.

What is claimed is:

1. A method of ripping a plate material having a first part at which the plate material is to be ripped, comprising steps of:
   holding the plate material at a first side of the first part between an upper mold and a lower mold in a thickness direction of the plate material;
   clamping the plate material at a second side of the first part between a punch and a pad in the thickness direction of the plate material by moving the punch toward the pad, the pad being positioned beneath the punch, an edge of the punch in a width direction orthogonal to the thickness direction overhanging the plate material at said first side of the first part and the punch extending across the first part in the width direction;
   moving in the thickness direction the punch, the plate material at said second side, and the pad positioned beneath the punch, so that the second side is at a different elevation along the thickness direction than at least a first portion of the plate material at said first side; and
   during said moving, deforming a second portion of the plate material at said first side by contacting said second portion against a guide face surface of the punch, said guide face surface being located toward said punch edge so as to overhang the plate material at said first side in the width direction, said second portion being located between said first part and a portion of the plate material being held at said first side; and
   applying tension, through operation and guiding of the punch, to the first part in the width direction, after said holding and said clamping and during said moving, in a manner for pulling the first side from the second side in the width direction without bending the first part into a different elevation relative to the thickness direction so as to rip the plate material along the first part.

2. The method of claim 1, wherein the first part comprises a linear arrangement of holes with an intervening material portion along the linear arrangement between each hole.

3. The method of claim 2 wherein the plate material comprises at least one part with a breakable boundary.

4. The method of claim 1, wherein the first part comprises a linear arrangement of material parts of one thickness with an intervening material portion of a greater thickness along the linear arrangement between each material part of said one thickness.

5. The method of claim 1, wherein the first part has a given width and extends for a length in which at a center of the width along said length the first part has a thickness less than a thickness to each side of said center.

6. A method of ripping a plate material having a first part at which the plate material is to be ripped, comprising steps of:
   holding the plate material at each one of a first portion of the plate material at a first side of the first part and a second portion of the plate material at a second side of the first part, wherein a third portion of the plate material is located between the first portion and the second portion and includes the first part;
   moving said first portion and said second portion relative to each other in a thickness direction of the plate material so that the first portion is at a different elevation than the second portion in the thickness direction;
   stopping in a thickness direction of the plate material at least a part of the third portion located between the first part and one of the held first and second portions during said relative moving, the stopped part of the third portion being shifted toward said one of the held first and second portions with respect to the first part in a direction orthogonal to the thickness direction, so that movement of the part of the third portion along with said one of the first and second held portions relative to another of the first and second held portions is stopped in the thickness direction; and
   setting the other of the first and second held portions to be at a shallower elevation in the thickness direction due to said moving, than said one of the first and second held portions and the stopped portion, thereby applying tension to the first part in said direction orthogonal to the thickness direction in a manner for pulling the first portion from the second portion of the plate material in the width direction without bending the first part into a different elevation relative to the thickness direction so as to rip the plate material along the first part.

7. The method of claim 6, wherein the first part comprises a linear arrangement of holes with an intervening material portion along the linear arrangement between each hole.

8. The method of claim 6, wherein the first part comprises a linear arrangement of material parts of one thickness with an intervening material portion of a greater thickness along the linear arrangement between each material part of said one thickness.

9. The method of claim 6, wherein the first part has a given width and extends for a length in which at a center of the width along said length the first part has a thickness less than a thickness to each side of said center.

10. A method of ripping a plate material having a breakable boundary within, the method comprising:
    holding the plate material between an upper pad and a lower die on a first side of the breakable boundary;
    moving a punch toward a lower pad to clamp the plate material between the punch and the lower pad on a second side of the breakable boundary, wherein the punch comprises a punch face, a step portion and a guide face, the step portion accommodating the breakable boundary, and wherein the guide face has a flat portion and an adjoining curved portion, the guide face configured so that the plate material can slide across the guide face; and moving the punch further toward the lower pad to cause the plate material to slide across the guide face of the punch so as to apply a pulling tension to the breakable boundary held in the step portion, the pulling tension being in a purely lateral direction of the plate material through operation and guiding with the prim guide face so as to pull apart the plate material without bending along the breakable boundary.

11. The method of claim 10, wherein the breakable boundary comprises one or more of linearly arranged alternating holes and narrow parts, alternating thin parts and narrow parts, and an elongated thin part.

* * * * *

UNITED STATES PATENT AND TRADEMARK OFFICE
CERTIFICATE OF CORRECTION

PATENT NO.         : 8,827,130 B2
APPLICATION NO.    : 13/172981
DATED              : September 9, 2014
INVENTOR(S)        : Inoue Page 1 of 1

It is certified that error appears in the above-identified patent and that said Letters Patent is hereby corrected as shown below:

In the Claim

Column 9, line 6, Claim 10 should be corrected as follows:

from "operation and guiding with the prim guide face so as to"

to --operation and guiding with the guide face so as to--

Signed and Sealed this
Second Day of December, 2014

Michelle K. Lee
*Deputy Director of the United States Patent and Trademark Office*